United States Patent [19]

Williams

[11] Patent Number: 4,811,961
[45] Date of Patent: Mar. 14, 1989

[54] SEAL FOR ROTATING CYLINDERS SUCH AS KILNS AND THE LIKE

[75] Inventor: John T. Williams, Wauwatosa, Wis.
[73] Assignee: Boliden Allis, Inc., Milwaukee, Wis.
[21] Appl. No.: 179,080
[22] Filed: Apr. 8, 1988
[51] Int. Cl.[4] .............................................. F16J 15/32
[52] U.S. Cl. ................................... 277/199; 277/815; 277/154; 277/155
[58] Field of Search ................ 277/81 S, 84, 152–155, 277/192, 199

[56] References Cited

U.S. PATENT DOCUMENTS

| | | | |
|---|---|---|---|
| 1,662,225 | 3/1928 | Wiggins | 220/224 |
| 1,698,158 | 1/1929 | Glass | 220/222 |
| 2,997,200 | 8/1961 | Giannini et al. | 220/222 |
| 3,383,115 | 5/1968 | Eckley et al. | 277/192 X |
| 4,405,137 | 9/1983 | Webb | 277/199 X |
| 4,433,848 | 2/1984 | Williams | 277/199 |

Primary Examiner—Robert S. Ward
Attorney, Agent, or Firm—Robert B Benson

[57] ABSTRACT

A seal for use in sealing an annular opening between a stationary member and a rotating cylinder telescopically arranged with the stationary member, the seal comprising a series of partially overlapping members circumscribing the cylinder adjacent the stationary member and closing the annular opening. The seal comprises a series of self-biasing leaf members attached to the stationary member and being biased into sealing engagement with the rotating member and a series of blanket members positioned adjacent the seal members to prevent leakage from the gaps between adjacent leaf members to substantially seal the annular opening between the rotating and stationary members.

13 Claims, 2 Drawing Sheets

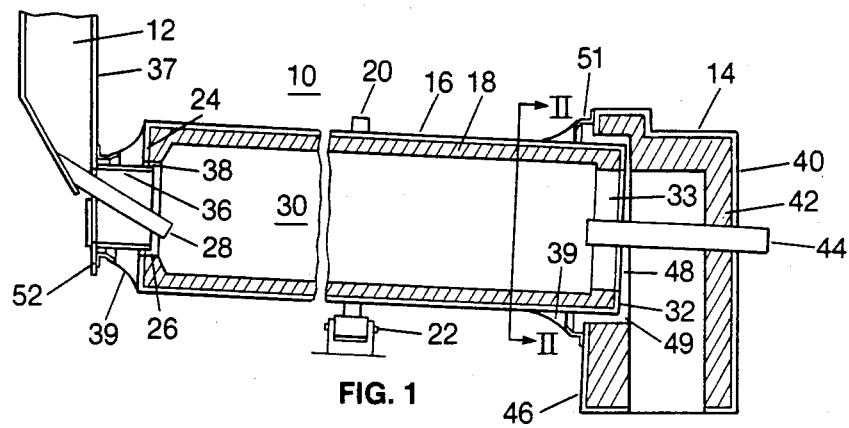
FIG. 1
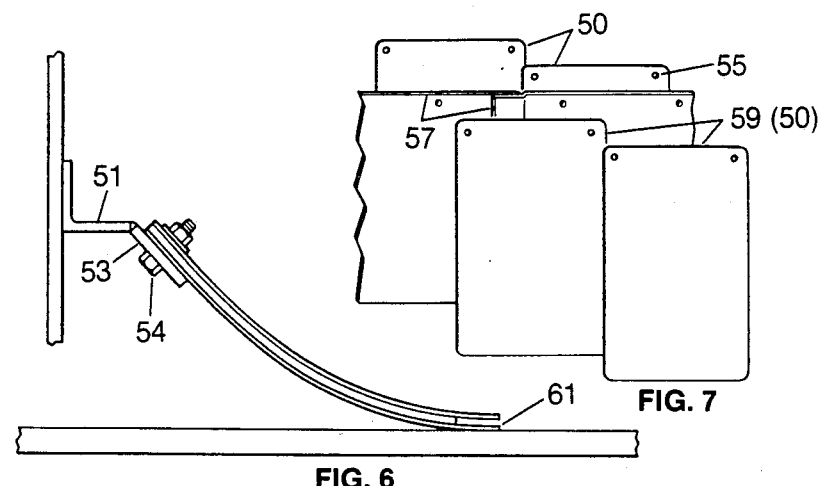
FIG. 7
FIG. 6
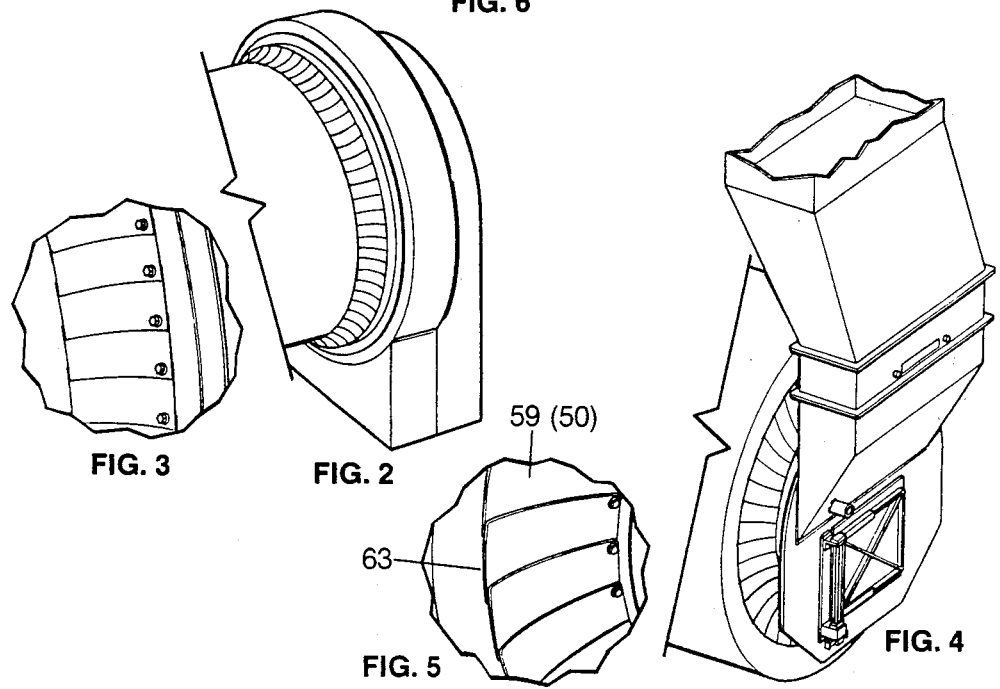
FIG. 3
FIG. 2
FIG. 5
FIG. 4

SEAL FOR ROTATING CYLINDERS SUCH AS KILNS AND THE LIKE

TECHNICAL FIELD

This invention relates to air or gas sealing arrangements for rotating cylinders such as rotary kilns or the like, whereby the ingress and egress of diluent and contaminating gaseous fluids at the ends of the rotating cylinder are significantly reduced by the sealing arrangement.

DESCRIPTION OF THE PRIOR ART

Many means are known in the prior art for sealing the annular clearance space between a rotating cylinder such as a rotary kiln and a stationary structure such as a feed housing at one end of the rotating kiln or a firing hood at the opposite end of the rotating kiln. For example, the annular seal of U.S. Pat. No. 3,042,389 has a self-counterweighted construction such that the center of gravity of the annular seal lies in a plane normal to the axis of rotation of the cylinder in which the annular sealing ring contacts the outer surface of the kiln. This construction results in the creation of a force moment arm which causes the annular sealing ring to be continuously urged into sealing engagement with the associated stationary structure, such as the stationary feed end housing at one end or the stationary firing hood at the opposite end of the rotating kiln. The seal construction just described substantially prevents leakage of gaseous fluid through the annular clearance space between the rotating cylinder and the stationary structures at the respective opposite ends of the rotating cylinder.

A variation of the annular seal for rotating cylinders is described in U.S. Pat. No. 4,280,707. This seal utilizes a plurality of circumferentially extending seal segments which are pivotally jointed to permit articulation of the joined segments in a plane perpendicular to the axis of the rotating cylinder to accommodate "out-of-round" portions of the circumference of the cylinder.

Another seal known in the prior art for large rotating cylinders utilizes a series of circumferentially spaced thin leaf members attached at one end to the stationary member and having the other end biased into continuous engagement with the rotating member. The leaf members are circumferentially spaced and partially overlapping to provide a continuous seal along the outer surface of the kiln. However, in operation, small spaces or gaps develop between adjacent leaf members as the kiln rotates especially if the outer kiln surface is irregular or out-of-round.

STATEMENT OF THE INVENTION

It is an object of the present invention to provide an improvement in the seal arrangement for the type of equipment just described above in which a series of adjacent leaf-type seal members are mounted on the stationary member and are continuously biased toward the rotating member so that as the cylinder rotates the outer edges of the leaf seal members continuously move to accommodate manufacturing tolerances and variable shell outside diameters and thereby maintain sealing engagement with the outer sealing surface of the rotating member.

In achievement of this objective, there is provided in the invention a second set of leaf-like members positioned to overlap the edges of the first set of leafs to prevent leakage between adjacent members of the first set of leafs.

Further objects and advantages of the invention will become apparent from the following description taken in conjunction with the accompanying drawings in which:

BRIEF DESCRIPTION OF THE DRAWINGS

FIG. 1 is a side elevation view partially in section of a rotary kiln embodying the present invention;

FIG. 2 is a three dimensional view taken along the line II—II of FIG. 1 showing the seal of this invention attached to the firing hood at the end of the kiln;

FIG. 3 is an enlarged view of the seal elements attached to the firing hood;

FIG. 4 is a three dimensional view of the seal of this invention attached to the feed end housing of the kiln;

FIG. 5 is an enlarged fragmentary section of the seal element attached to the feed end hood of the kiln;

FIG. 6 is an enlarged detailed view of one of the seal elements attached to the end of the discharge bin of the annular seal member;

FIG. 7 is an enlarged view showing how the seal elements are arranged relative to each other.

DESCRIPTION OF THE PREFERRED EMBODIMENT

Figure 8:
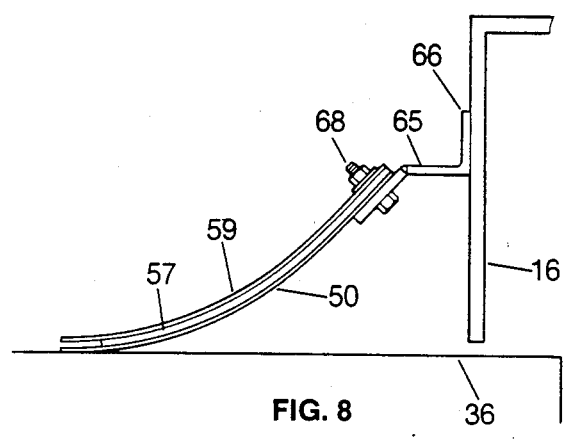
FIG. 8 is an enlarged detailed view showing a modification of the seal elements in which the elements are attached to the rotating kiln shell and the loose ends engage the outer surface of a stationary tube.

Referring now to the drawings, and more particularly to FIG. 1, there is shown a rotary kiln generally indicated at 10 which inclines slightly downwardly from a feed end housing 12 to a firing hood 14 to assist in the movement of material through the kiln from a feed end 12 to the firing hood 14. Kiln 10 comprises a tubular or cylindrical shell 16 having an internal lining 18 formed of a suitable refractory material such as, for example, refractory bricks. A plurality of riding rings 20, only one of which is shown in the drawings, is disposed circumferentially about shell 16 and is supported on suitable carrying rollers 22. Suitable drive means (not shown) are provided, such as, for example, a motor driven ring gear circumferentially mounted about shell 16, for rotating shell 16 about its longitudinal axis.

An annular end plate 24 is secured to one end of the kiln and defines a substantially circular feed opening 26 through which a feed material, either dry or as a slurry, is fed from a chute 28 interconnecting kiln chamber 30 and a suitable storage facility (not shown).

Another annular end plate 32 is secured to the opposite end of shell 16 and defines a substantially circular discharge opening 33 through which the material, after treatment in the kiln, is discharged. After being discharged from the kiln, the material flows to conveyors, coolers, or the like depending upon the type of processing required for the material being treated.

At the feed end of the kiln, chute 28 is supported within the feed end housing 12 and extends through a collar 36 mounted on wall 37 of housing 12 and extending into the shell 16. The outer diameter of the collar 36 is smaller than the opening 26 of end plate 24 attached to the cylindrical shell 16. The dimensional difference between outer diameter of collar 36 and the inner diameter 26 defines an annulus 38 between the collar 36 and the shell 16 which allows the kiln shell 16 to rotate during operation without binding between kiln shell 16 and collar 36. The seal members 39 of this invention are attached to wall 37 to which the collar 36 is attached and extend outwardly into engagement with end plate 24 of the kiln shell 16.

The firing hood 14 is positioned adjacent the discharge end of kiln 10. The hood comprises a housing 40 having a lining 42 formed of a suitable refractory material. Firing hood 14 contains a conventional burner 44 through which is fed the mixture of fuel and oxygen designed for the specific process to be employed in the kiln.

Firing hood housing 40 includes a front wall 46 having defined therein an opening 48 which circumscribes the outer periphery of kiln shell 16 to define an annular space 49 therebetween. Wall 46 is substantially normal to the axis of rotation of kiln 10. The portion of hood front wall 46 extending radially away from opening 48 defines a surface for mounting the seal members 39 of this invention.

The seal of this invention is best shown in FIG. 6 and will be described initially in connection with the firing hood. The seal comprises a series of leaf-like members 50 removably attached on a bracket 51 which in turn is mounted on wall 46. The bracket 51 is fixed to the wall such as by welding and has an outwardly extending flange 53 to which the seal members 50 are removably attached such as by bolts 54 extending through holes 55 in the upper corners of the seal members 50. The seal members are 50, all generally rectangular in shape and removably mounted on flange 53 because they are subjected to severe wear during operation and must be periodically replaced to maintain a good seal.

The leaf members extend axially away from the wall 46 and into engagement with the outer surface of shell 16. The leaf members 50 are made of a resilient material such as thin spring steel and are mounted so that the outer edges 61 are continuously urged into sealing engagement with the outer surface of the shell 16. The leaf members are circumferentially spaced around the shell in a slightly overlapping position as shown in FIG. 7 to form a continuous sealing surface between the kiln shell 16 and the hood 14.

A set of generally rectangular blanket members 57 are mounted on the wall 46 adjacent the leaf members. The blanket members 57 are circumferentially spaced and partially overlapping and extend axially alongside the leaf members 50 but are staggered relative to the leaf members, as shown in FIG. 7, to cover edges of adjacent leaf members to prevent leakage of any gas through gaps that form during operation between adjacent leaf members. If desired, the blanket members 57 can span several leaf members.

The blanket members 57 can be made of any suitable material such as a ceramic fiber blanket material and should be biased into engagement with the leaf members for best sealing results. To this end, a second set of self-biasing leaf members 59 may be provided to continuously urge the blanket 57 members into engagement with the first set of leaf members 50. The second set of leaf members are mounted on the wall 46 in the same way as the first set of leaf members are mounted.

The outer ends 61 of leaf members engage the rotating shell 16 to perform the primary sealing function and move radially as the kiln rotates to maintain a sealing engagement with the outer surface of the shell regardless of irregularities in the outer surface of the kiln. Unfortunately, the radial movement tends to increase the size of cracks or gaps that naturally form between adjacent leafs. The gaps occur primarily in the area where the leafs have a maximum curvature between the ends of the leaf. It is this area that the blankets 57 function to prevent the flow of gas through the seal.

An alternative arrangement of the seal of this invention is shown at the feed end of the kiln 10 and illustrated in FIGS. 4 and 5. The leaf members 50 of the seal are circumferentially arranged and attached to the wall 37 by brackets 52. The leafs extend radially outward into sealing engagement with end plate 24 of shell 16 and are spaced to form a continuous member to seal the annular opening 38. In this arrangement, the leaf members engage the flat surface of the end plate 24 rather than the cylindrical surface of the shell 16 as shown with the leaf members 50 at the discharge end of the kiln. However, during operation, the rotating end plate 24 presents an irregular surface to the ends 63 of the leaf members 50 causing them to move slightly to maintain contact with the surface of the plate 24 and insure a continuous seal between the atmosphere and the interior of the shell. As mentioned in connection with the leafs 50 at the discharge end, this movement tends to enlarge the gaps that form between adjacent leaf members especially in the area of maximum bending of the leafs. Therefore, blanket members 57 are mounted on wall 37 and are spaced to bridge the edges of adjacent leafs to seal any gaps that occur between adjacent leafs.

Figure 9:
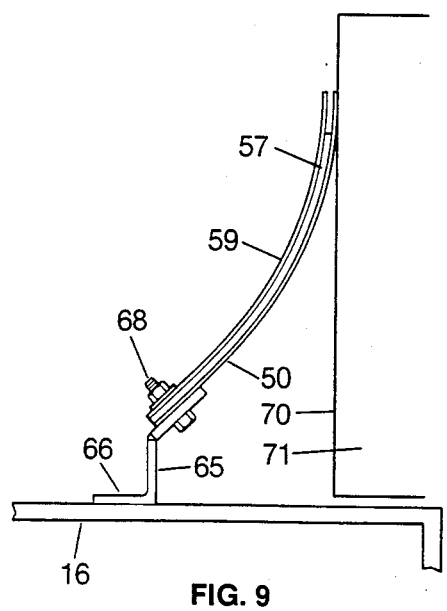
FIG. 9 is an enlarged detailed view showing the seal element attached to the rotating shell and the loose ends engaging the radially extending outer flat surface of a stationary housing.

In some cases, it may be more effective or convenient to mount the leaf and blanket members on the rotating cylinder rather than the stationary member. Such arrangements are shown in FIGS. 8 and 9. In FIG. 8, the leaf members 50, 59 and blanket members 57 are detachably mounted on a bracket 65 by bolts 68. The bracket in turn is mounted on an annular ring 66 welded to the outer surface of shell 16. In FIG. 8, the leafs extend axially outward relative to the axis of rotation of the shell to engage the cylindrical surface of a collar-like member extending from the feed end housing. In FIG. 9, the leafs are shown extending radially outward relative to the axis of rotation of the shell to engage the flat surface of a stationary housing in sealing relationship. As described in connection with the other embodiments, gaps occur between adjacent leafs 50 especially in the area of maximum bend of the leafs. These gaps tend to become larger as the shell rotates and the outer edges of leafs 50 move across the surface 70 of the housing 71. The blanket members 57 are arranged to bridge the edges of adjacent leaf members 50 to cover the gaps that occur between adjacent leafs and thereby improve the seal between the interior of the shell 16 and atmosphere. A second set of leaf members 59 are mounted on bracket 65 and positioned adjacent blanket members 57 to bias the blanket members into engagement with the first set of leaf members in the same way and for the same purpose as described in connection with the other embodiments of this invention.

The blanket members 57 are preferably made of a fabric-like flexible material and are large enough to span several leaf members if desired. As shown in FIG. 7, adjacent blanket members 57 overlap to form a continuous surface.

Although we have shown and described two sets of leaf members in connection with the discharge end of the kiln, it is clear that one set of leaf members and the blanket members would be satisfactory in many applications. In such applications, it would be preferable to use blankets that are preformed to conform to the shape to be assumed by the leaf members. It would also be useful if the blankets had some self-biasing characteristics. In addition, in such an application, the blanket members should be positioned on the lower pressure side of the leaf members so that the pressure differential between the interior of the shell and atmosphere can be used to help bias the blankets into engagement with the leafs.

As shown in FIG. 6, the blankets are shorter than the leafs. This arrangement is provided because the outer ends of the leafs engage the shell and the leafs provide the primary seal between the shell 16 and atmosphere. The blankets are only needed to cover the gaps between leafs that form during operation primarily in the area where the leafs have their maximum curvature.

When the blankets are positioned between the interior of the shell and atmosphere, they also provide an insulating effect between the hot gases in the kiln and the leafs. Therefore, in such an application, it is desirable to make the blankets of a heat insulating material. The use of such material will reduce distortion of the leaf members and thereby increase their useful life.

From the foregoing detailed description of the invention, it has been shown how the objects of the invention have been obtained in a preferred manner. However, modifications and equivalents of the disclosed concepts such as readily occurred to those skilled in the art are intended to be included within the scope of this invention.

The embodiments of the invention in which an exclusive property or privilege is claimed are defined as follows:

1. An apparatus comprising in combination a stationary member and a rotating cylinder telescopically arranged in said stationary member and said cylinder coacting with said stationary member to define an annular opening therebetween, and a seal circumscribing said cylinder adjacent said stationary member and closing said annular opening, said seal comprising:
    a series of leaf members attached to said stationary member and extending outwardly toward and being self-biased into engagement with the outer surface of said rotating cylinder, said leaf members being circumferentially spaced and partially overlapping to form a continuous surface to completely cover the annular opening between said rotating cylinder and said stationary member,
    a series of flexible blanket members attached to said stationary member and extending toward said cylinder and positioned adjacent said leaf members, said blanket members being circumferentially spaced to cover the overlapping edges of adjacent leaf members to improve the sealing effect between the interior of said rotating cylinder and atmosphere.

2. The apparatus of claim 1 in which the leaf members extend in an axial direction relative to said cylinder and engage the outer cylindrical surface of said cylindrical member.

3. The apparatus of claim 1 in which said cylinder has a flat radially extending plate at the end, and a said leaf members extend radially outward relative to said cylinder and engage the outer surface of said plate.

4. The apparatus of claim 1 in which a second set of self-biasing leaf members are mounted on said stationary member said second set being circumferentially spaced and partially overlapping and being mounted on the opposite side of said blanket member to sandwich said blanket member between said sets of leaf members.

5. The apparatus of claim 1 in which adjacent said blanket members are partially overlapping.

6. The apparatus of claim 5 in which said blanket members spans at least three leaf members.

7. The apparatus of claim 1 in which said leafs are made of thin spring steel.

8. The apparatus of claim 1 in which said blanket members are made of a self-biasing material and are arranged so that said blankets are biased into engagement with said leaf members.

9. The apparatus of claim 1 in which there is a pressure differential across said seal and said blanket members are positioned on the high pressure side of said leaf members whereby the pressure of the gas in the kiln faces said blanket members into engagement with said leaf members.

10. The apparatus of claim 1 in which said blankets are made of a heat insulating material and are positioned on the side of said leafs adjacent the interior of said cylinder.

11. The apparatus of claim 1 in which said blanket members are shorter than said leaf members to enable the outer edges of said leaf members to directly engage the outer surface of said rotating member to effect sealing directly therebetween.

12. An apparatus comprising in combination a stationary member and a rotating cylinder member telescopically arranged with said stationary member and said cylinder member coacting with said stationary member to define an annular opening therebetween, and a seal circumscribing said cylinder member adjacent said stationary member and closing said annular opening, said seal comprising:
    a series of leaf elements attached to one of said stationary member or said cylinder member and extending toward and being self-biased into engagement with the outer surface of the other of said members, said leaf elements being circumferentially spaced and partially overlapping to form a continuous surface to completely cover the annular opening between said rotating cylinder member and said stationary member,
    a series of flexible blanket elements attached to the same member to which said leaf elements are attached and extending outwardly and positioned adjacent said leaf element, said blanket members being circumferentially spaced to cover the gaps between adjacent leaf members to improve the sealing effect between the interior of said rotating cylinder and atmosphere.

13. The apparatus of claim 12 in which said leaf members and said blanket members are attached to said rotating cylindrical member.

* * * * *